US008484121B2

(12) United States Patent
Balabon

(10) Patent No.: US 8,484,121 B2
(45) Date of Patent: Jul. 9, 2013

(54) SYSTEM AND METHOD FOR EXECUTION DELAYED TRADING

(76) Inventor: Sam Balabon, Houston, TX (US)

( * ) Notice: Subject to any disclaimer, the term of this patent is extended or adjusted under 35 U.S.C. 154(b) by 1423 days.

(21) Appl. No.: 10/840,378

(22) Filed: May 7, 2004

(65) Prior Publication Data

US 2005/0075963 A1    Apr. 7, 2005

Related U.S. Application Data

(63) Continuation-in-part of application No. 10/730,360, filed on Dec. 9, 2003, now Pat. No. 7,076,461.

(60) Provisional application No. 60/431,913, filed on Dec. 9, 2002.

(51) Int. Cl.
*G06Q 40/00* (2012.01)

(52) U.S. Cl.
USPC ............................................................ 705/37

(58) Field of Classification Search
None
See application file for complete search history.

(56) References Cited

U.S. PATENT DOCUMENTS

| | | | |
|---|---|---|---|
| 5,689,652 A | 11/1997 | Lupien et al. | |
| 5,819,238 A * | 10/1998 | Fernholz | 705/36 R |
| 6,134,536 A * | 10/2000 | Shepherd | 705/37 |
| 6,405,180 B2 * | 6/2002 | Tilfors et al. | 705/36 R |
| 6,408,282 B1 | 6/2002 | Buist | |
| 6,594,643 B1 | 7/2003 | Freeny, Jr. | |
| 6,601,044 B1 * | 7/2003 | Wallman | 705/36 R |
| 6,618,707 B1 | 9/2003 | Gary | |
| 6,850,907 B2 | 2/2005 | Lutnick et al. | |
| 7,035,819 B1 | 4/2006 | Gianakouros et al. | |
| 7,225,153 B2 * | 5/2007 | Lange | 705/37 |
| 7,383,220 B1 * | 6/2008 | Keith | 705/37 |
| 7,392,214 B1 * | 6/2008 | Fraser et al. | 705/37 |
| 7,428,506 B2 * | 9/2008 | Waelbroeck et al. | 705/37 |
| 7,461,023 B1 * | 12/2008 | Helweg | 705/37 |
| 2001/0044767 A1 * | 11/2001 | Madoff et al. | 705/37 |
| 2002/0023043 A1 * | 2/2002 | Samukawa et al. | 705/37 |
| 2002/0049645 A1 * | 4/2002 | Takahashi | 705/26 |
| 2002/0161693 A1 | 10/2002 | Greenwald | |
| 2003/0014351 A1 * | 1/2003 | Neff et al. | 705/37 |
| 2003/0200167 A1 * | 10/2003 | Kemp et al. | 705/37 |
| 2003/0216932 A1 * | 11/2003 | Foley | 705/1 |

(Continued)

FOREIGN PATENT DOCUMENTS

| | | |
|---|---|---|
| JP | 2002117232 A | 4/2002 |
| WO | WO 00/70520 | 11/2000 |

OTHER PUBLICATIONS

Chang, Pei Chann; An On-line Rescheduling Algorithm for Maintaining Efficiency and Stability of Failure-prone Manufacturing Systems (Abstract); Dec. 1989; Lehigh University, Dissertations/Thesis; DAI-B 50/06, p. 2569.*

(Continued)

*Primary Examiner* — Virpi Kanervo

(57) ABSTRACT

A method and system for trading financial instruments with an execution delay. According to one embodiment, a trading system receives from a first party an order to trade a financial instrument, the order specifying timing information for delaying completion of the order, determines a current market value of the financial instrument upon matching the order with a contra order of a second party, and completes the order only if the determined market value of the financial instrument remains unchanged for an amount of time based on the timing information specified in the order.

9 Claims, 14 Drawing Sheets

U.S. PATENT DOCUMENTS

| | | | |
|---|---|---|---|
| 2004/0024689 | A1 | 2/2004 | Zhou et al. |
| 2004/0030632 | A1 | 2/2004 | Hausman |
| 2004/0059666 | A1 | 3/2004 | Waelbroeck et al. |
| 2004/0143538 | A1 | 7/2004 | Korhammer et al. |
| 2004/0177024 | A1 | 9/2004 | Bok et al. |
| 2005/0075965 | A1* | 4/2005 | Cutler .............................. 705/37 |

OTHER PUBLICATIONS

Elton, Edwin J. et al.; Intra-Day Tests of the Efficiency of the Treasure Bill Futures Market (Abstract); Feb. 1984; The Review of Economics and Statistics; vol. 66, Issue 1, p. 129.*

Lake, David; Inter-listing Forges Trans-Pacific Bonds; Nov. 1988; Asian Finance; vol. 14, Issue 11, p. 52.*

PhD dissertation of Patrick Conroy entitled, "Limit Orders Versus Market Orders: Theory and Evidence," published in vol. 59/02-A of Dissertation Abstracts International, 1997, p. 572.

Trade Throughs for Simpletons? (Trends), Traders Magazine, Jun. 1, 2004.

Chapman, Peter, Pooling Fragmented Market Liquidity: Vendor's Buyside and Sellside Approach (Lava Trading markets technology that consolidates every limit order and quote found in Nasdaq montage onto single screen), Trader Magazine, Jul. 2001.

Securities and Exchange Commission (Release No. 34-52418), Self-Regulatory Organizations; International Securities Exchange, Inc.; Order Approving a Proposed Rule Change to Amend the Exchange's Trade-Through and Locked Market Rules, Sep. 13, 2005.

Benveniste et al., *What's special about the specialist?*, Journal of Financial Economics, 1992, pp. 61-86.

Mobilepro Corp., *Annual Report Under Section 13 or 15(d) of the Securities Exchange Act of 1934*, Commission File No. 002-97869-D, U.S. Security and Exchange Commission, available at <<http://www.sec.gov/Archives/edgar/data/769592/000114420404009233/v04223_10-ksb.htm>>.

"Researchers Study the Cost of Conducting Trades in Financial Markets", Stanford Business School, Mar. 1995, http://www.gsb.stanford.edu/research/faculty/news_releases/peter.reiss/werner.htm (printed Nov. 3, 2003).

Ljungqvist, Alexander P. et al., "Hot Markets, Investor Sentiment, and IPO Pricing", Nov. 6, 2003, AFA 2004 San Diego Meetings; Twelfth Annual Utah Winter Finance Conference; Texas Finance Festival; posted Nov. 2, 2003 at http://papers.ssrn.com/sol3/papers.cfm?abstract_id=282293.

Brown, David P. et al., "Adjustable Limit Orders", Mar. 15, 2002, posted Jun. 1, 2000 at http://www.kelley.iu.edu/Finance/wp3.htm.

Web Pages for "Order Types Available on RealTick ©" at http://www.terranovaonline.com/TNO_Forms/PDF_Forms/RT_OrderTypes.pdf.

Schmerken, Ivy, "New Kids on the Block", Mar. 26, 2004, Wall Street & Technology Online, available at http://www.wallstreetandtech.com/showArticle.jhtml?articleID=18402829.

* cited by examiner

Order Entry Screen 400

| Buy/Sell | Quantity | Symbol | Expire | Price |
|---|---|---|---|---|
| 600 | 610 | 620 | 630 | 640 |
| ○ Buy<br>○ Sell | [   ]<br>Show [   ] | [   ] | ○ Day<br>○ GTC | [   ] Min<br>[   ] Max |

| PEG | PEG DIFFERENCE | Static Peg Activation | Static Peg Execution |
|---|---|---|---|
| 650 | 660 | 670 | 680 |
| ○ Bid<br>○ Mid<br>○ Ask | [   ]<br>Number of Pennies | [   ] Min. Secs | [   ] Min. Secs<br>[   ] Max. Secs |

690 — Enter Order

FIG. 6

Order Display Screen 480

| | | | 700 | 710 | 720 | 730 |
|---|---|---|---|---|---|---|
| Get Symbol | | | | | 01/21/2004 | 1:06:03 PM |
| Symbol | YHOO | | Price | Current | Last | Last 5 avg |
| Last | 47.38 | BID | 47.35 | 1.4 | 7.3 | 2.4 secs |
| Change | -0.28 | ASK | 47.37 | 2.5 | 5.4 | 3.8 secs |
| Volume | 826,500 | MID | 47.36 | 1.4 | 5.4 | 3.0 secs |

| Buy Orders | | | Sell Orders | | | Buy/Sell Mid Orders | | |
|---|---|---|---|---|---|---|---|---|
| Shares | Price | Execute | Shares | Price | Execute | Shares | Price | Execute |
| 5000 | 47.35 | 1/2 B | 5000 | 47.37 | 1/2 A | 8000 | 47.36 | 1/2 M |
| 10000 | 47.35 | 1/3 B | 8000 | 47.37 | 1/2 A | 10000 | 47.36 | 1/4 M |
| HIDE | 47.34 | 2/5 B | 10000 | 47.38 | 1/4 A | 15000 | 47.36 | 2/6 M |
| 25000 | 47.27 | 1/4 B | 100000 | 47.42 | 2/6 A | HIDE | 47.36 | 1/5 M |
| 50000 | 47.27 | 2/7 B | HIDE | 47.47 | 1/5 A | | | |
| 100000 | 47.22 | 1/5 B | | | | | | |
| 250001 | 47.15 | 2/10 B | | | | | | |

SYSTEM AND METHOD FOR EXECUTION DELAYED TRADING

CROSS REFERENCE TO RELATED APPLICATIONS

This is a continuation-in-part application of U.S. patent application Ser. No. 10/730,360, filed Dec. 9, 2003 now U.S. Pat. No. 7,076,461, which claims the benefit under 35 U.S.C. § 119(e) of U.S. Provisional Application No. 60/431,913, filed Dec. 9, 2002.

BACKGROUND OF THE INVENTION

Large institutions often wish to trade in sizes far beyond the liquidity that is instantly available in the market. In today's markets, the best bid or offer quote is usually good for only a few hundred or a few thousand shares. This number or shares is minuscule to institutions that want to trade 100,000 or a million shares. These institutions must carefully choose their trading strategies in order to get good prices on their trades. They face several obstacles:

1. Market Impact

Trading a large number of shares inevitably moves the share price. The art of trading is to complete the trade while minimizing the market impact; this often involves trading the shares slowly over time. Indeed, revealing the intention to trade, such as by posting a public limit order into an ECN (Electronic Communication Network) or a stock exchange, can itself cause market impact by scaring away the other side of the trade.

2. Front Running

Institutions are justifiably mistrustful that others in the industry will take advantage of their desire to trade through a practice known as "front running." One example of a classic front running situation is the case in which a broker finds out that a customer wants to buy a large number of shares. Knowing that this purchase interest will increase the share price, the broker buys a number of shares for her or his own account. Alas, this purchasing itself pushes up the price, meaning that the original customer pays a higher price than necessary for the shares.

Other types of front running are more subtle. For example, a trader who sees a large limit order in an ECN to buy at $20 may guess that the stock will soon rise. The trader then puts in an order to buy at $20.01. If the stock rises, the trader makes a profit, and if the stock does not rise, then the trader can sell into the large limit order at $20.

Similarly, a sharp day trader who observes a particular trading pattern may correctly infer that someone is working a large buy order which will push prices up even further. This trader then buys shares, pushing up the price that the original purchaser has to pay to complete the block.

3. Adverse Selection

No one ever wants to trade with someone who knows more than they do, because they will likely lose in the transaction. An institution that decides to buy a million shares may end up purchasing them from a seller who knows more than they do. This information may originate from within the firm, as in classical insider trading, or the information could be that the other institution wants to sell ten million shares.

Over the years, a variety of methods have been developed to solve the institutional trading problem:

1. The NYSE Floor

The information environment on the NYSE floor is very complex and generally poorly understood by outsiders. On the NYSE, small orders are handled by computers, but large orders are still negotiated face to face. An institution gives an order to a floor broker, who physically stands at the post on the NYSE where a particular stock is traded. This floor broker interacts on a continuing basis with the other floor brokers and with the NYSE specialist. Hence, the reputation of the floor broker and the specialist are extremely important.

The floor broker will often reveal bits and pieces of information to the floor IF he or she thinks that it will help fill the order at a better price. The floor broker with a large order will talk with others in the crowd and with the specialist to find out if other brokers are working large orders. Often the specialist will point out to a buyer that another floor broker is representing a seller and the two floor brokers will negotiate the trade face to face. The advantage of this method is that only serious buyers and sellers find out about the desire to trade, reducing information leakage and thus market impact.

2. "Upstairs" Market

In the so-called "upstairs" market, an institution gives the order to a brokerage firm with experience in trading blocks. In the classic approach, the broker then calls natural counter parties. For example, if a buyer wants to purchase 1 million shares, the block broker will first contact its other clients that have been recent sellers and see if they want to sell some more. The broker will also examine institutional holdings and look for holders that have been reducing their stakes. A skilled block broker can thus find the natural counter party to the trade without spilling the trading information to the whole world.

3. ECNs

Unlike the NYSE floor, ECNs offer speed and anonymity. However, the transparency of ECNs deters investors from placing very large orders into them. Displaying a large order just invites front running behavior from traders who are watching the book. Even if the other traders don't actively front run, displaying a large order may spook the other side of the trade into withdrawing and waiting for a better price.

ECNs often allow "reserve" or hidden orders that are not displayed in the ECN book as one solution to the excess transparency problem. However, this is not a complete solution to the block trading problem.

4. Basket Trading

Because one of the main risks to traders is that the other side knows more than they do, traders often attempt to prove that they have no information about a particular stock. One way to do this is to trade an entire portfolio. Thus, a mutual fund that has experienced a fund outflow may want to sell an entire basket of stocks. A block trader such as the equity trading desk at Goldman or Merrill may bid aggressively to purchase the entire basket, knowing that the seller has no special information about where the stocks are going.

5. "Slice and Dice" Trading

The opposite of the basket/block approach is the "Slice and Dice" approach. Given the problems with market impact, one of the obvious ways to reduce impact is to break the order up into smaller pieces and then make a number of small trades. Trading software today makes it easy to break up an order and drip it continuously into the market. Smart order routers opportunistically move orders to whatever venue has liquidity at the moment.

"Slice and Dice" trading has become very popular in recent years because many institutions evaluate the performance of their trading desks against a VWAP (Value Weighted Average Price) benchmark. A trader who breaks up the order and continuously drips or sprays it into the marketplace will come pretty close to the VWAP benchmark.

6. POSIT

ITG, Inc. operates the POSIT matching system. In the POSIT system, investors place anonymous and secret orders into a matching system that conducts periodic matches during the trading day. If a match is found, the trade is crossed at the midpoint of the bid-ask spread. ITG also acts as an agency broker for institutions, helping them to work the residuals that don't match in POSIT, and they also provide a variety of trading tools. In addition, ITG's TriAct system also allows incoming order flow to interact against the orders they are holding on their way to market.

7. Liquidnet

Liquidnet operates a Napster-like system in which the LiquidNet software operates on the order management software of large buy-side institutions. The LiquidNet software acts like a trusted spy and talks to the other LiquidNet processes running at other institutions. When it finds a matching order, a little chat box pops up only on the screens of the two matching entities so that they can anonymously negotiate the trade. Only the two natural counter parties ever find out about the trading interest of the other side.

8. NYFIX Millennium

NYFIX started off as a back office technology provider, transmitting order flow to other trading platforms. However, they were carrying so much order flow that they now offer firms the ability to trade against that order flow.

None of these methods, however, provide a complete solution to the institutional trading problem. Accordingly, there is a need in the art for a system and method that improves price discovery and reduces slippage associated with trading large orders of financial instruments such as equities.

SUMMARY OF THE INVENTION

Embodiments of the present invention provide for trading financial instruments with an execution delay. According to one embodiment, a trading system receives from a first party an order to trade a financial instrument, the order specifying timing information for delaying completion of the order, determines a current market value of the financial instrument upon matching the order with a contra order of a second party, and completes the order only if the determined market value of the financial instrument remains unchanged for an amount of time based on the timing information specified in the order.

A trading system according to an embodiment of the present invention provides a continuous auction market that reduces the cost of placing limit orders and thus increases liquidity in markets such as the equity markets.

BRIEF DESCRIPTION OF THE DRAWINGS

FIG. 6 is a screen shot of an order entry screen in accordance with an embodiment of the present invention.

FIG. 7 is a screen shot of an order display screen in accordance with an embodiment of the present invention.

DETAILED DESCRIPTION

Overview

Figure 1:
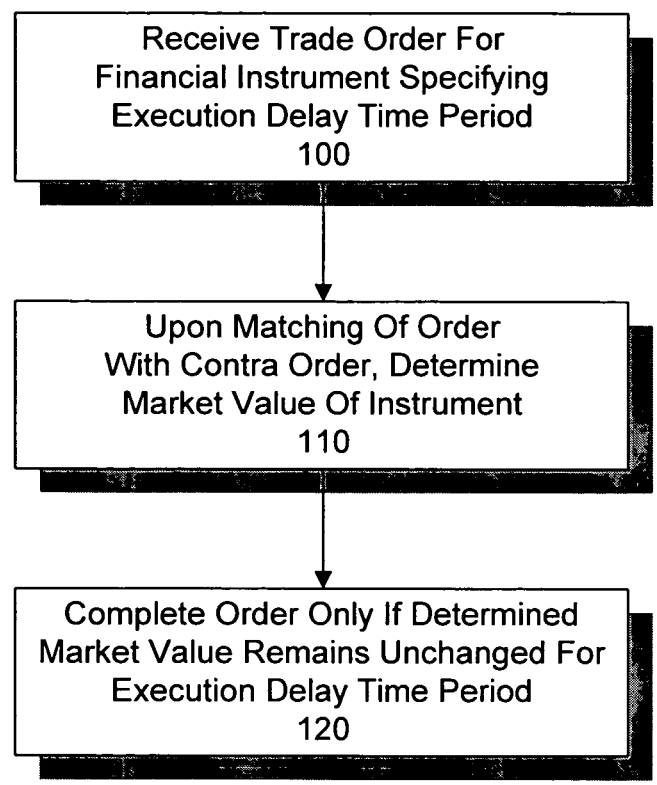
FIG. 1 is a flow chart that depicts a process for implementing execution delayed trading in accordance with an embodiment of the present invention.

FIG. 1 depicts a process for implementing execution delayed trading in accordance with an embodiment of the present invention. A trading system receives an order to trade a financial instrument that specifies timing information for delaying completion of the order (step 100). Upon matching of the order with a contra order, the trading system determines a current market value of the financial instrument (step 110), and completes the order only if the determined market value of the financial instrument remains unchanged for an amount of time based on the timing information specified in the order. (step 120).

By allowing traders to peg their orders to a financial instrument quote (such as the bid, ask or midpoint of the NBBO (National Best Bid and Offer)) and having the orders only execute if the quote remains unchanged for a predefined amount of time (such as a random time period within a user-specified minimum and maximum time limit, or a pre-set or variable amount of time necessary to verify the pertinent quote in other systems in order to verify the price of the peg), the trading system of the present invention reduces the cost to move money into the market and out of the market, improves the efficiency of the transaction between the buyer and seller by eliminating opportunistic electronic trading programs from the transaction, and reduces many risks associated with placing orders.

Embodiments of the present invention lower the following risks associated with placing limit orders:

A. Inventory risk is reduced because the trading system provides the ability to trade in only steady markets. This is because each trade will require a level of market stability in order to execute. This is achieved by making sure executions will only occur after prices stay steady for a predetermined time before a trade can occur. The level of market stability can be adjusted by increasing or decreasing the minimum time that the peg must remain unchanged in order to execute the trade. The greater the minimum required time of an unchanged quote the greater price stability of the financial instrument to be traded.

B. Option to rest of the market is reduced because the trading system prevents market participants from using orders displayed in the system as a type of low-cost option by placing orders that improve the price of a displayed bid or offer by a penny or even smaller amounts. The ability to peg with execution delays based on unchanged quotes discourages traders from relying on the option that a displayed order provides to place orders on the same side of the market that marginally improve on the displayed order's price.

C. Asymmetric information impact is also reduced. Current systems give market participants the ability to trade on new public information before existing limit orders can be changed to reflect this new public information. When a negative news event occurs the quotes in the standard order books will be picked off first in most cases before the orders of the system of the present invention will begin to execute. One example is a news release of a major terrorism event. If this event occurs, in matter of seconds, all existing buy limit orders in standard order books will be picked off until the market price of the financial instrument adjusts to reflect the new information. The adjustable random execution delay aspect of the present invention prevents limit orders from being picked off immediately after news of the event is released. In this event buy limit orders in the trading system of the present invention may not execute at all or they may execute some time after such an event at much lower prices than the existing limit orders in standard trading systems that are executed immediately after the news event.

The trading system of the present invention also provides for a new market where picking off orders by informed traders will become a more costly endeavor than currently and will have new consequences. This is due to the increased uncertainty of trade executions. Once an order has been matched with a contra order at any time during the random time execution delay, the pegged quote can change and thus prevent an execution. The informed traders will have to weigh the opportunity costs to delay picking off firm (i.e., not conditioned on an execution delay) limit orders in standard order books in hopes to get an execution with the orders in the system of the present invention.

Embodiments of the invention provide the following benefits to equity trading:

A. Neither the buyer nor seller will know what exact time the trade will occur or if the trade will occur at all. This equals the playing field between the manual online order entry systems that are offered to the majority of traders and the direct order entry systems that are operated by proprietary computer programs of the broker dealers that are connected directly to the order books.

B. The limit order structure having an execution condition based on a minimum and maximum random time delay off an unchanged quote protects limit orders in fast markets and declining markets.

C. The use of a minimum and maximum random time delay off an unchanged quote creates a new mechanism to establish market value of a stock. Using this new mechanism to establish market value, the invention provides a new type of limit order that is priced away from the market value of a financial instrument, thus creating a new type of order book that shows deeper liquidity the greater the price distance from the inside quotes of financial instruments. The invention introduces "advertising" of large orders of financial instruments to the financial markets.

D. The orders in a system of the present invention are easy to understand and don't require many order entry fields.

Architecture

Figure 2:
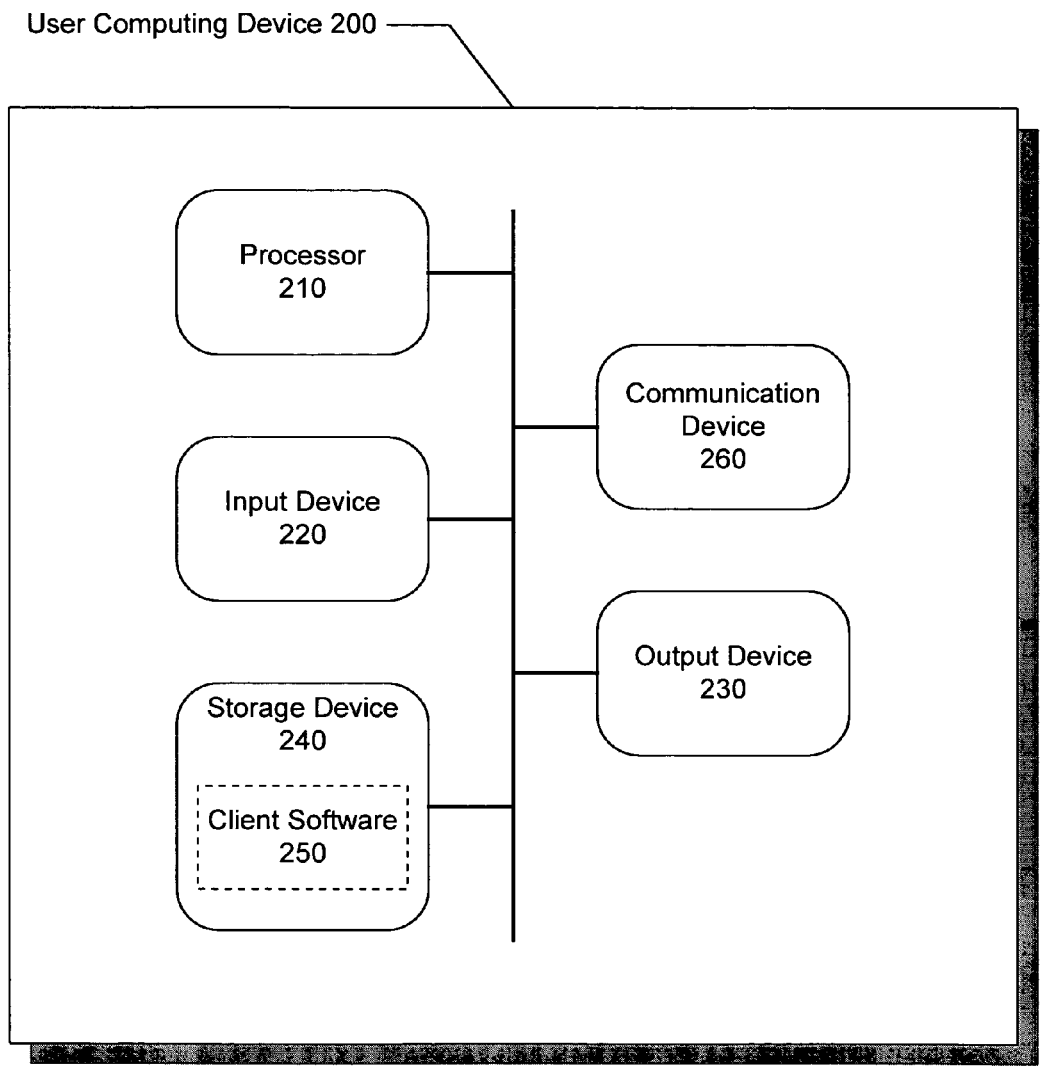
FIG. 2 is a block diagram that depicts a user computing device in accordance with an embodiment of the present invention.
Figure 3:
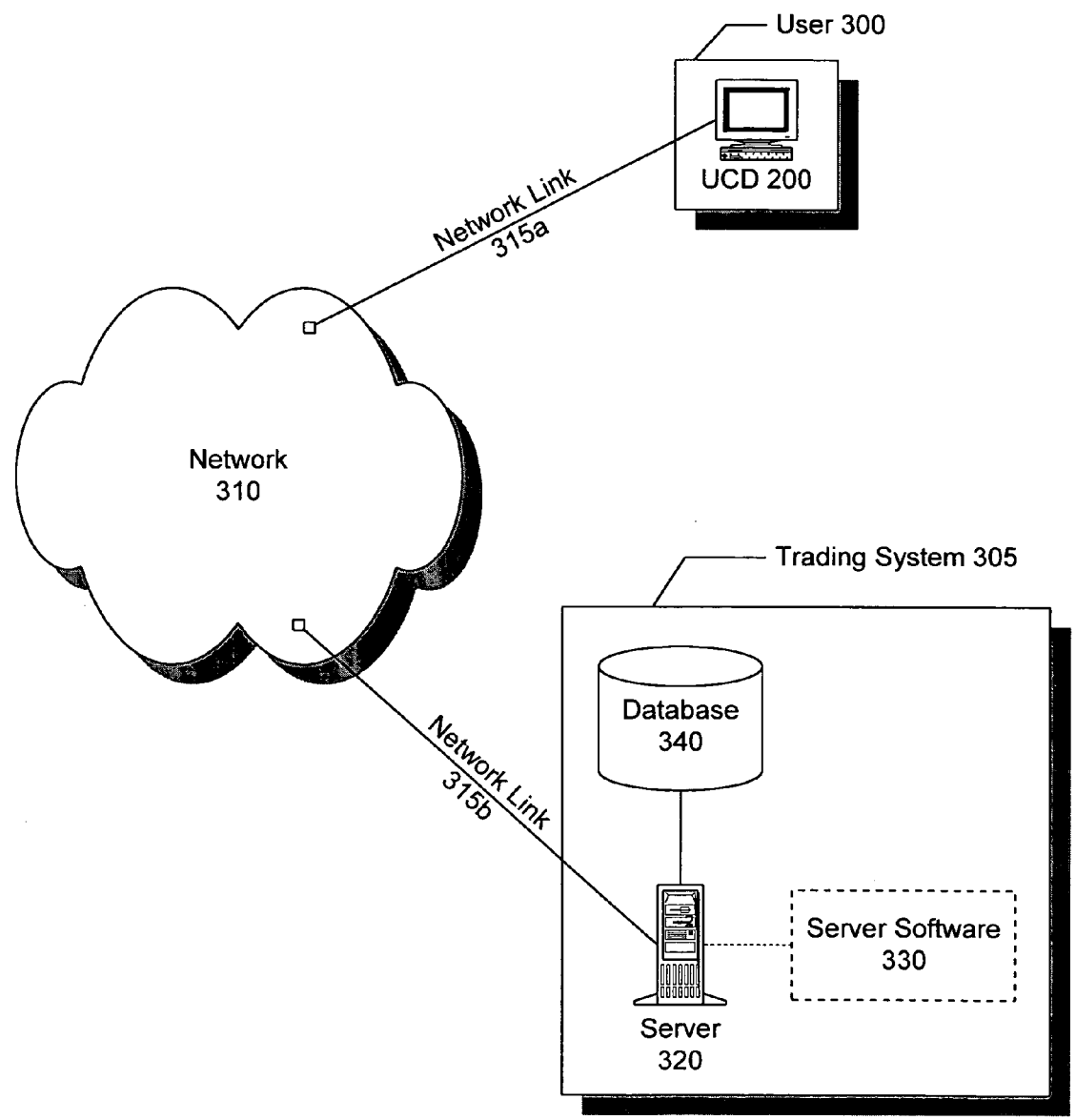
FIG. 3 is a block diagram that depicts a system architecture for execution delayed trading in accordance with an embodiment of the present invention.

FIGS. 2 and 3 illustrate the components of a basic computer and network architecture in accordance with an embodiment of the present invention. FIG. 2 depicts user computing device 200, which may be a personal computer, workstation, handheld personal digital assistant ("PDA"), or any other type of microprocessor-based device. User computing device 200 may include a processor 210, input device 220, output device 230, storage device 240, client software 250, and communication device 260.

Input device 220 may include a keyboard, mouse, pen-operated touch screen or monitor, voice-recognition device, or any other device that accepts input. Output device 230 may include a monitor, printer, disk drive, speakers, or any other device that provides output.

Storage device 240 may include volatile and nonvolatile data storage, including one or more electrical, magnetic or optical memories such as a RAM, cache, hard drive, CD-ROM drive, tape drive or removable storage disk. Communication device 260 may include a modem, network interface card, or any other device capable of transmitting and receiving signals over a network. The components of user computing device 200 may be connected via an electrical bus or wirelessly.

Client software 250 may be stored in storage device 240 and executed by processor 210, and may include, for example, web browser software or the client side of client/server software that implements the functionality of the present invention.

FIG. 3 illustrates a network architecture in accordance with an embodiment of the present invention. The network architecture allows user 300 to access trading system 305, embodying the above/below market trading functionality of the present invention through server software 320, on user computing device 200 through network 310.

Network links 315 may include telephone lines, DSL, cable networks, T1 or T3 lines, wireless network connections, or any other arrangement that implements the transmission and reception of network signals. Network 310 may include any type of interconnected communication system, and may implement any communications protocol, which may secured by any security protocol.

In one particular embodiment, trading system 305 may be an ECN embodying the functionality of the present invention. Server 320 includes a processor and memory for executing program instructions, as well as a network interface, and may include a collection of servers, such as an application server and a database server. Database 340 may represent a relational or object database, and may be accessed via server 320.

User computing device 200 and server 320 may implement any operating system, such as Windows or UNIX. Client software 250 and server software 330 may be written in any programming language, such as C, C++, Java or Visual Basic.

Figure 4:
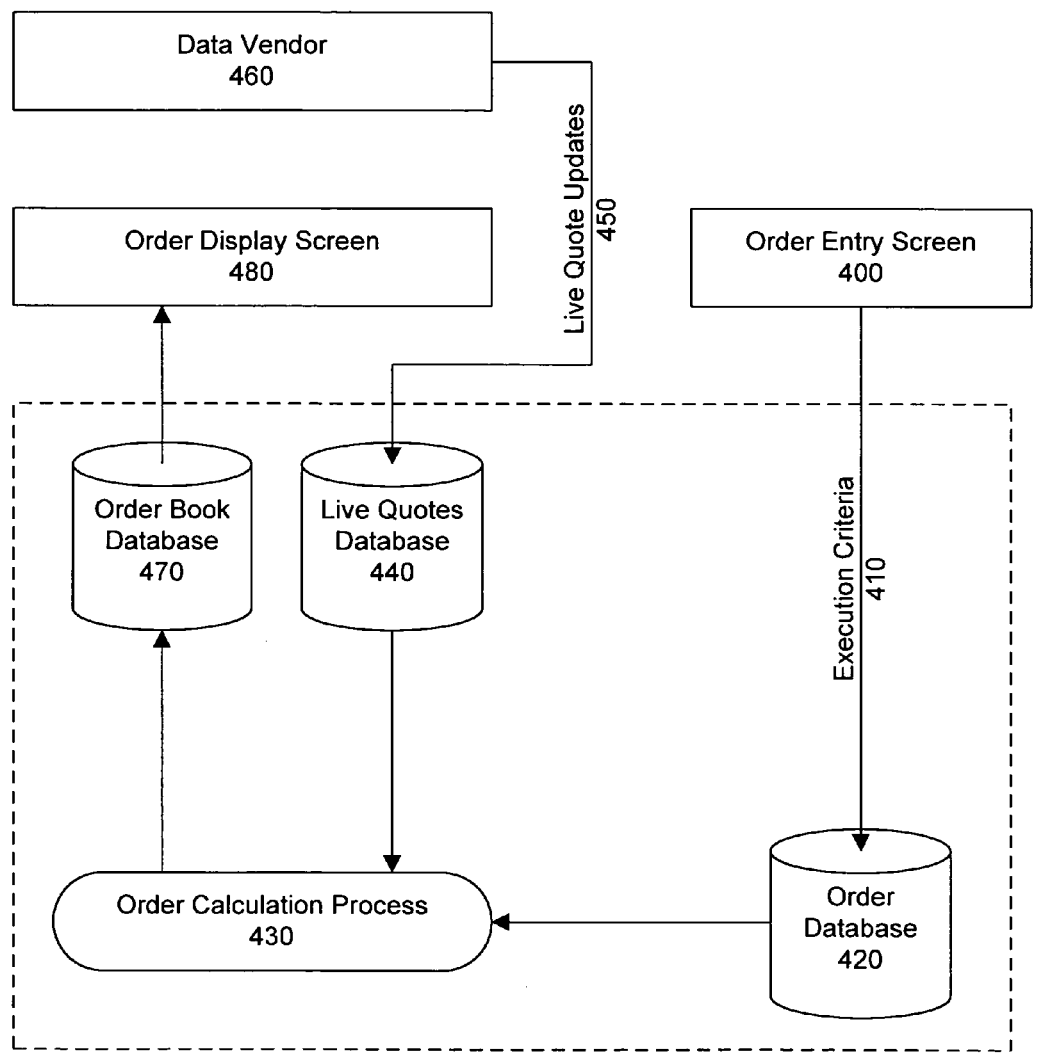
FIG. 4 is a block diagram that depicts data flow in execution delayed trading in accordance with an embodiment of the present invention.

FIG. 4 depicts a data flow block diagram in accordance with an embodiment of the present invention. Trading system 305 (marked by the dotted square box) receives execution criteria 410 (e.g., execution delay time period information) along with other order information from user 300 through order entry screen 400. The order information is stored in order database 420 and continuously processed with live quotes via order calculation process 430. Live quote updates 450 are continuously provided by data vendor 460 and stored in live quotes database 440. As the order information is calculated, it is stored in order book database 470 and displayed to other users through order display screen 480 (via the Internet, for example).

EXAMPLE EMBODIMENT

Figure 5:
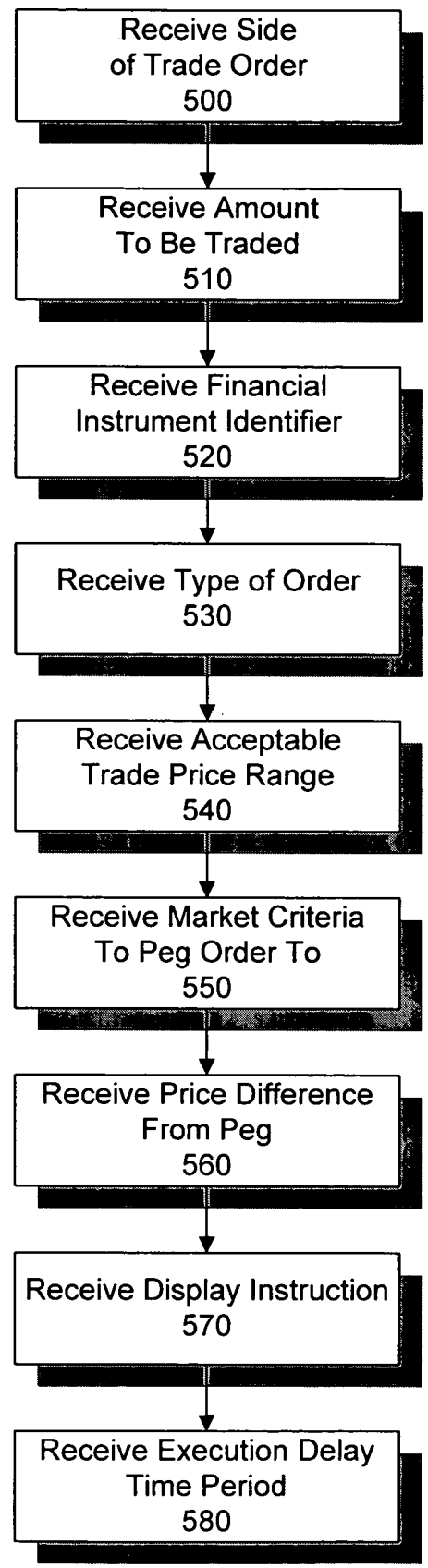
FIG. 5 is a flow chart that depicts order entry to an execution delayed trading system in accordance with an embodiment of the present invention.

FIG. 5 depicts order entry to trading system 305 from a buyer or seller (e.g., user 300) in accordance with an embodiment of the present invention, and FIG. 6 depicts a possible order entry screen. In step 500, trading system 305 receives the side of a trade order, such as "buy" or "sell" (column 600).

The system then receives the amount to be traded (step 510, column 610), along with an identifier for the financial instrument to be traded (step 520, column 620). When using trading system 305 in the stock market, for example, the amount and identifier may include the number of shares of a stock and the stock symbol, respectively. Trading system 305 may accept and trade orders for any financial instrument, including stocks, bonds, funds, contracts, options, futures, commodities and currencies.

In step 530, the system receives the type of order (column 630). For example, if user 300 were to click on the "Day" button in FIG. 6, the order would expire at the end of the day. If user 300 were to click on the "GTC" button, the order would be good until canceled. The system receives the minimum and maximum price acceptable to trade in step 540 (column 640); user 300 may enter the same price in both fields.

In step 550, the system receives market criteria for calculating the market value to which the order will be pegged. This market criteria may include the bid, ask, midpoint of bid and ask (all of which are shown in column 650), prices based on available lot sizes, VWAP, last trade, trailing averages and any other formula that uses active market data to determine a price. The bid, ask and midpoint may include those prices determined by the NBBO.

In step 560, the system receives the price difference from the pegged market value upon which the order may execute. This difference may be entered as a percentage or dollar amount (as shown in column 660), for example.

If user 300 desires to specify additional conditions for activating and/or executing the order, trading system 305 may receive such conditions in steps 570 and 580, respectively. These conditions are generally based on stable market data so that user 305 may insure against sudden price declines or surges. Order activation conditions may include, for example, activating the order only if the market value of the instrument remains unchanged for a particular interval of time (as shown in column 670), or activating the order only on a one-minute up tick on a particular market index, such as the Dow Jones Industrial Average, NASDAQ composite index, etc. Order execution conditions may include, for example, completing the order only if a particular market index increases during a particular interval of time (e.g., one minute) after the order is accepted, completing the order only if the market value of the instrument remains unchanged for a particular interval of time (as shown in column 680) or any other formula that uses active market data to determine a market condition of execution.

By pressing button 690 in FIG. 6, user 300 submits the order to trading system 305. After trading system 305 receives the order, it is placed for public display. In one embodiment, the order may be posted on a web-accessible site over network 310, with each listing provided in a bulletin board type fashion, as shown by order display screen 480 in FIG. 7. The system may choose to display limited information about the order to the public, such as the identity and amount of each order's underlying instrument, along with any other execution conditions, if specified. Additionally, trading system 305 may allow user 300 to hide their order entirely, or show only a portion of their order.

In order display screen 480 in FIG. 7, user 300 may enter a stock symbol in the field next to the "Get Symbol" label on the top left corner of the screen, press the "Go" button, and be presented with the order book of that particular stock (e.g., "YHOO"). Underneath the "Get Symbol" label, the "Last" field represents the last traded price of the stock, the "Change" field represents the price change from the close of the previous day, and the "Volume" field represents the day's total trading volume.

In the "Price" column (700), the "Bid" field represents the best offer to buy at least 100 shares of the stock, the "Ask" field represents the best offer to sell at least 100 shares of the stock, and the "Mid" field represents the midpoint price between the bid price and the ask price. The "Current" column (710) represents the amount of time since the most recent change in price of the bid, ask and midpoint prices; these values will be incrementing like a running stopwatch. The "Last" column (720) represents the amount of time that has elapsed between the last two changes in price of the bid, ask and midpoint prices. The "Last 5 avg" column (730) represents the average amount of time that has elapsed between the last five changes in price of the bid, ask and midpoint prices.

Column 740 represents buy limit orders for a particular stock, displaying the amount of shares, price and execution criteria for each. Similarly, column 750 represents sell limit orders for a particular stock, displaying the amount of shares, price and execution criteria for each. Column 760 represents buy or sell limit orders priced at the midpoint of the stock; in this embodiment all limit orders pegged at the "midpoint only" without any price difference from midpoint are treated the same as any other orders except there is no indication if the order is a buy or sell order posted on the order book. Thus, 50% of all active orders attempting to pick off "midpoint only" limit orders will be rejected because of wrong side of trade. This policy aims to protect the users from any information leakage.

The execution criteria "½ B" (for example, as listed in the first listing of column 740) means that in order for an execution for this limit order to occur, the bid price must remain unchanged for a minimum of 1 second after trading system 305 matches the order with a contra order. A random number between 1 and 2 seconds is assigned to the match. The bid quote must remain unchanged for this random assigned time, for example 1.8 seconds. If the bid remains unchanged for 1.8 seconds the execution will occur at 1.8 seconds. If the bid changes before the 1.8 seconds then trading system 305 resets the execution clock and assigns a new minimum time, such as 1.5 seconds, to the trade. Trading system 305 continually attempts to execute the order until it succeeds based on the pre-entered conditions of the limit order or is canceled by either the buyer or seller. Cancellations of orders by either the buyer or seller will pend until the current execution attempt fails. It will be impossible for either the buyer or seller to know in advance the exact time when the execution will occur or if the execution will occur at all due to a constantly changing peg. During the execution process, the limit order being hit is displayed on the system's order book as active, an indication that the order is available for trading.

Once the order is displayed, it may be accepted only if activated (i.e., made available for trading). Trading system 305 may indicate that an order is available for trading by, for example, associating a particular color with the posted order. In one embodiment, if an order is colored green, it is active (i.e., available for trading); if the order is colored gray, then the order is inactive (i.e., not available for trading)—potentially due to non-satisfaction of an activation condition.

Figure 8:
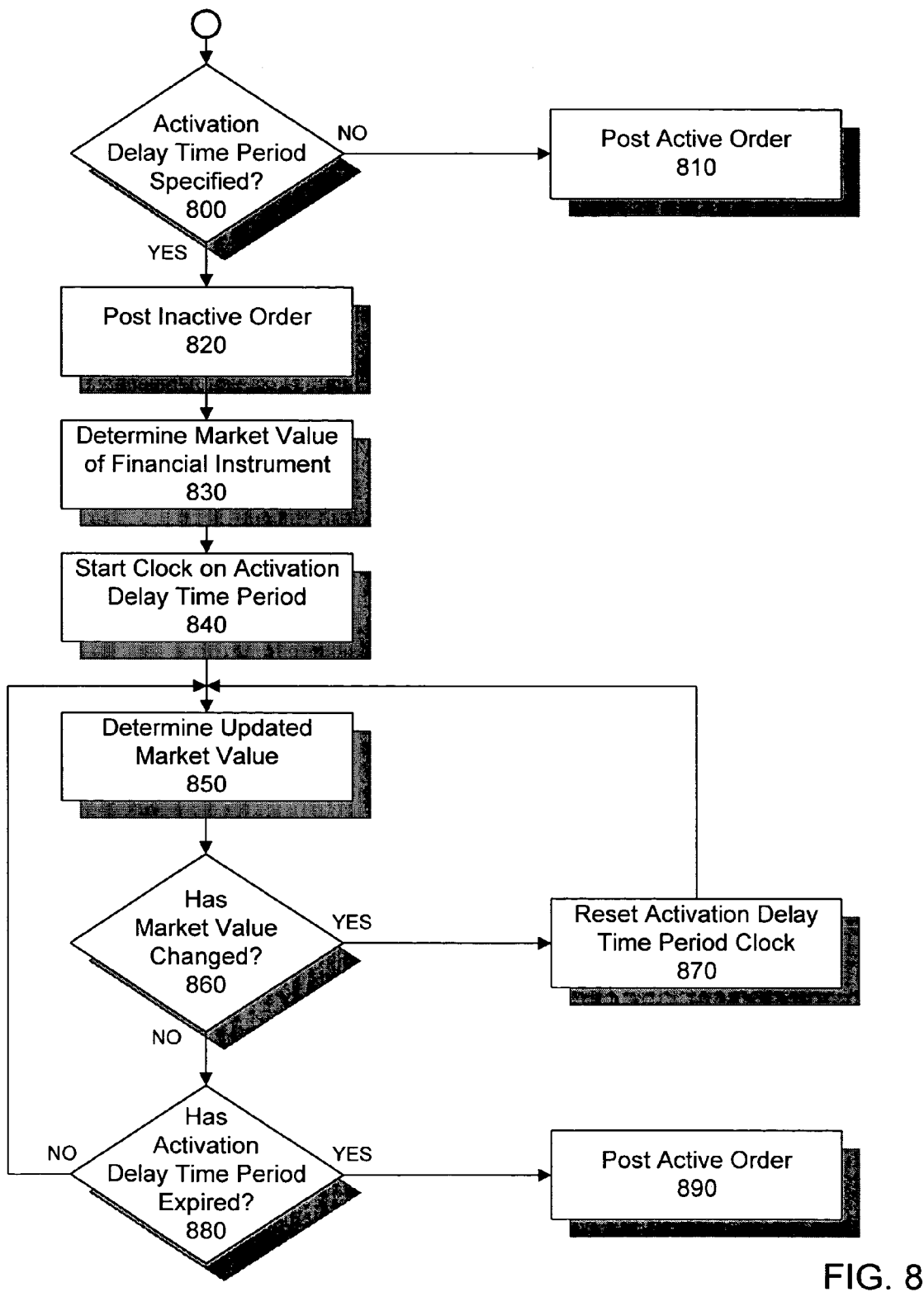
FIG. 8 is a flow chart that depicts activation of execution delayed trades in accordance with an embodiment of the present invention.

FIG. 8 depicts a static peg activation scenario in accordance with an embodiment of the present invention, whereby the order is activated only if the pegged market value of the instrument remains unchanged for a particular interval of time. If no activation condition is specified with an order (step 800), then trading system 305 posts an active order (step 810). However, if a static peg activation condition is specified, then the system posts an inactive order (step 820), determines the market value (e.g., bid, ask or midpoint) of the financial instrument (step 830) and starts a clock (i.e., timer) on the activation delay time period (step 840). The system then determines an updated market value (step 850), and if the value changes (step 860) before the activation delay time period expires (step 880), then the clock is reset (step 870). If not, trading system 305 posts an active order (step 890).

This static peg activation aspect of the present invention addresses the risks associated with pegging systems in today's equity markets whereby traders peg to the bid or ask price of the inside quote of an equity, thus allowing their limit orders to float with the bid or ask. One risk is that other traders will identify the limit order as being pegged to the bid or ask. In stocks with large spreads this can be especially costly to the traders who use pegging systems because once their order has been identified as a peg order, other traders can send and cancel as few as a 100 share limit order in less than a few seconds to manipulate the price of the pegged order. This means the price of a 10,000 share limit order if pegged can be manipulated by a 100 share order entered into the market and immediately canceled.

For example: XYZ stock's bid price is $7.56 and it's ask price is $7.99. Trader A places an order to buy 5,000 shares of XYZ stock and pegs the order to the bid. The buy limit order is entered into the market at $7.56 which is the bid. Trader B enters a buy limit order to buy 1,000 shares of XYZ stock at $7.57. Trader A's 5,000 limit order is immediately re-priced at $7.57. Trader C is a seller and sees that Trader A's order automatically re-priced the instant Trader's B order was entered. Thus, Trader C enters a hundred share buy limit order at $7.98 and then immediately cancels it. Trader A's order automatically goes to $7.98 and then Trader C picks off Trader A's order, basically cheating trader A out of the spread.

Other risks are temporary imbalances in the supply and demand of a stock. This can happen when there are not enough shares to fill market orders at the inside quote. Automated fill programs can simply pick off any limit order at multiple price points resulting in large gyrations in the price of a stock. This can result in very quick price increases and declines that lead to brief liquidity voids that last as few as a couple of seconds. Once other traders recognize that the automated fill program is completed, they immediately start bidding up limit order prices until they reach close to the prior price of the stock before the automated fill program hit the stock.

Pegging to the inside quote can result in better or worse executions compared to other order types such as market orders or standard limit orders. One aspect of the static peg activation aspect of the present invention is to reduce the time periods that it is not in the trader's interest to peg to the inside quote. A second aspect is to create a new order type that is easy for traders to use with few fields of order entry.

An order posted by trading system 305 (whether active or inactive) may list the offered buy or sell price in different ways, such as by percentage (i.e., percentage discount off the current market value), a price differential (i.e., distance in monetary amount away from current market value), or the actual offered buy/sell price. For this last display method, trading system 305 may continuously update the offered buy/sell price by scanning the current market price to which the order is pegged (using third party market scanning software in one embodiment), and subtracting/adding the specified distance, if any, from that market value for display.

Embodiments of trading system 305 are not limited in the ways in which an order may be accepted. In one embodiment, a user may accept a posted order by clicking on it. In another embodiment, a user may enter an order on the opposite side of an existing order in the system, and the system will automatically match the two orders (if conforming), resulting in acceptance. Users of trading system 305 may be registered with the system, and be required to enter user identification and passwords for authentication.

Figure 9:
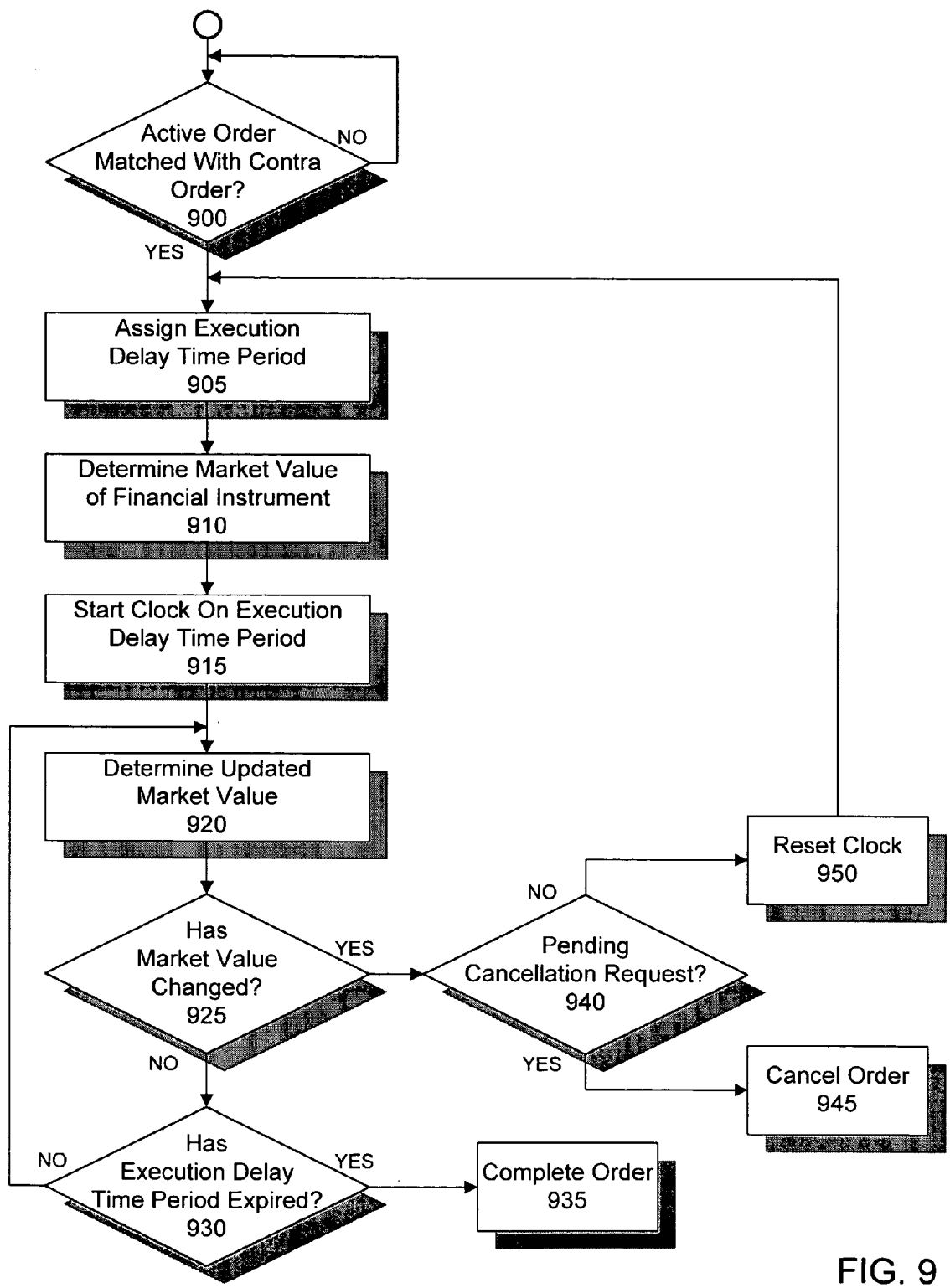
FIG. 9 is a flow chart that depicts execution of execution delayed trades in accordance with an embodiment of the present invention.

Once the order is accepted, trading system 305 determines if the trade can be completed according to the associated execution criteria. FIG. 9 depicts an execution scenario in accordance with an embodiment of the present invention.

Upon the matching of an active order with a contra order (step 900), the system assigns an execution delay time period based on the execution criteria of the matched orders (step 905). This execution delay time period could be, for example, a random time period within a user-specified minimum and maximum time limit, or a pre-set or variable amount of time (e.g., a fraction of a second) necessary to verify the pertinent quote in other systems in order to verify the price of the peg. The system then determines the appropriate market value (e.g., bid, ask or midpoint) of the financial instrument (step 910) and starts a clock on the execution delay time period (step 915). The system next determines an updated market value (step 920), and if the value changes (step 925) before the execution delay time period expires (step 930) then the clock is reset (step 950) and the process starts over, unless a cancellation request is pending (step 940) in which case the order is canceled (step 945). If market value does not change prior to the expiration of the execution delay time period, trading system 305 completes the order (step 935). Trading system 940 may complete the order by, for example, executing the order itself or submitting the order to a third party system for execution.

For example, suppose a limit order to buy 10,000 shares of ABC stock pegged to the bid at $25.00 with a 2-4 second static bid price requirement is received at trading system 305 at 13:00:00.

At 13:08:00 further suppose a limit order to sell 10,000 shares at bid is received at trading system 305 and is matched with the existing limit order to buy 10,000 shares of ABC stock. The system will match the orders and assign a random time (e.g., 2.8 seconds) for the initial matching of the orders. The clock will begin at the exact time the orders are matched. If the bid remains static for 2.8 seconds the system will execute the trade. If the bid changes any time before 2.8 seconds then the clock will restart and the system will assign a new time period between 2 to 4 seconds (e.g., 3.8 seconds on the second attempt) and will repeat this process until the orders are executed or canceled.

Once a match has been made and the system receives a cancel order, the cancellation will hang until the minimum time delay of a static quote condition has been met or not. If it is not met then the cancellation can take place at that point.

If a limit order is matched with multiple existing limit orders then the first existing order that meets its time contingency requirement will execute. Each time the peg changes a new minimum time requirement will be assigned to each of the existing limit orders. The first existing limit order that meets its time contingency requirements will execute with the limit order. If by remote chance two orders have the same price and are assigned the exact minimum time contingency then the order that was received first at trading system 305 will execute.

In another example, trading system 305 accepts a limit order that is priced away from its peg.

Example: at 15:30:00, trader A enters an inferior limit order to purchase 250,000 shares of ABC at a maximum price of $80.25 and a peg price of $0.10 below the NBB (national best bid).

An "inferior" limit order means that a buy limit order is priced below the bid or a sell limit order is priced above the ask. These orders are priced inferior to the quote prices of the NBBO, for example, and generally add liquidity to trading system 305. These limit orders can be fully or partially displayed in trading system 305 according to a particular embodiment. A "superior" limit order means that a buy limit order is priced above the ask or a sell limit order is priced below the bid. These limit orders generally take away liquidity from a trading system. These limit orders are not displayed in trading system 305 according to a particular embodiment.

Continuing with the example, trader A specifies that the NBB must remain unchanged for a random period between 5 and 10 seconds prior to execution and designates the order to be displayed in full. At 15:30:01, the bid is $79.90 and the ask is 79.92. The system displays trader A's order as an order to purchase 250,000 shares of ABC at a $0.10 discount to the National Best Bid with a displayed price of $79.80. At 15:40:00, trader B enters a superior limit order to sell 250,000 shares of ABC at a minimum price of $79.50, and a peg price of $0.10 below the NBB. At 15:40:00, the bid is $79.95 and the ask is $79.98. The system receives the order and matches the inferior and superior limit orders because all of the price conditions of both orders have been met: $0.10 below the NBB is $79.85, which matches both peg prices and is within each of the trader's minimum and maximum limit prices. Once the orders are matched, the system assigns an 8.3 second minimum time period of an unchanged bid to the order (8.3 seconds is not revealed to the buyer or seller). At 15:40:05, the NBB of ABC increases to $80.01, and so the orders are not executed because the NBB did not remain unchanged for 8.3 seconds. The orders remain potential matches, however, and the system assigns a new minimum time period of 7 seconds to the trade. This new time period begins at the time the bid changed. At 15:40:12, the NBB has remained constant for 7 seconds at $80.01 and the orders are executed at the price of $79.91.

According to a particular embodiment, once a superior limit order is received at trading system 305, the system will continuously attempt to match the superior limit order with an inferior limit order. The superior limit order will generally only be matched with an inferior limit order with equal or greater lot size. If the system matches two orders and the conditions of the inferior limit order are not met, then the system will keep the superior limit order active but may not display it. The system will continuously wait until it can match the superior limit order with an inferior limit order or until the superior limit order is canceled. If a cancel is received at the system for either the superior or inferior limit order, the system will cancel the order unless the order is in a pending match. If there is a pending match the system will wait until the order is executed. If the execution does not occur the order is canceled.

Above/Below Market Trading Embodiment

Figure 10:
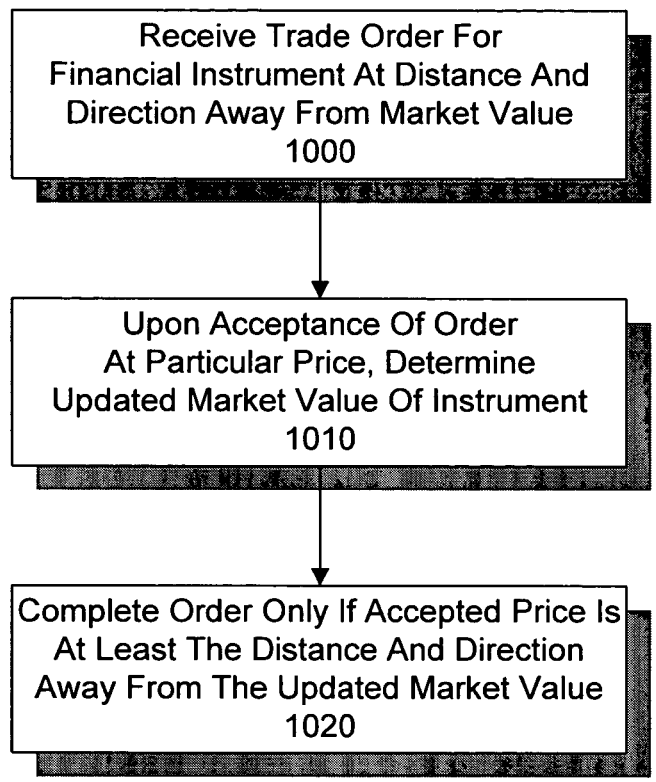
FIG. 10 is a flow chart that depicts a process for implementing above/below market trading in accordance with an embodiment of the present invention.

FIG. 10 depicts a process for implementing above/below market trading in accordance with an embodiment of the present invention. A trading system receives an order to trade a financial instrument at a predetermined distance and direction away from the instrument's market value (step 1000). Upon acceptance of the order at a particular price, the trading system determines the updated market value of the instrument (step 1010), and completes the order only if the accepted price is at least the predetermined distance and direction away from the updated market value (step 1020).

By executing orders at a specified discount, for example, and therefore outside market value, the party who enters the order into the trading system receives a discount to the current market value of the financial instrument, while the party who accepts the order posted by the trading system pays a premium above the current market value of the instrument. This is different to the current operation of limit orders in the open market, for example, which only execute once the market value of the underlying instrument reaches a specific price.

The trading system of the present invention creates a new form of liquidity for markets by taking advantage of the difference between the short term and long term liquidity values of financial instruments. The system allows the market to determine the value of this difference in the form of a discount, which is effectively converted into a tradable spread. This spread is much like the difference between the bid and ask prices of current trading systems.

Taking an example, assume that a stock S is trading at $10/share (a current market value of the share) and it can absorb only 500 share blocks without significantly affecting the market. Further assume that there is a broker/dealer interested in buying 50,000 shares of S providing she can buy it at a 2.5% discount (25 cents/share) lower than the market price of the stock which is constantly changing and is currently trading at $10/share. The broker/dealer estimates over the next three days she will be able to sell the shares at an average price of $9.80/share, thus realizing a profit of $0.05 cents a share or $2500.

However, to explore the possibility of finding a seller, the broker/dealer places an order to buy 50,000 shares of S pegged at $0.25 lower than the current trading price of stock S.

A mutual fund wants to sell 50,000 shares of S, and estimates that if she places a market order to sell, she will realize an average execution price of $9.70/share. Thus, the estimated loss for the seller would be $15,000 ($0.3/share*50,000 shares). The buyer sees the seller's order and estimates by accepting the price of $9.75 she will save $0.05/share or ($0.05*50,000) $2500 and thus reduce her selling costs to liquidate 50,000 shares of S from $15,000 to $12,500.

The mutual fund sees the posted order of the broker/dealer and accepts the price of $9.75 per share of S. In this instance both the broker/dealer and mutual fund receive a price improvement of $0.05 a share on the execution using the system. These price improvements are because of the inefficiency of current trading systems.

Figure 11:
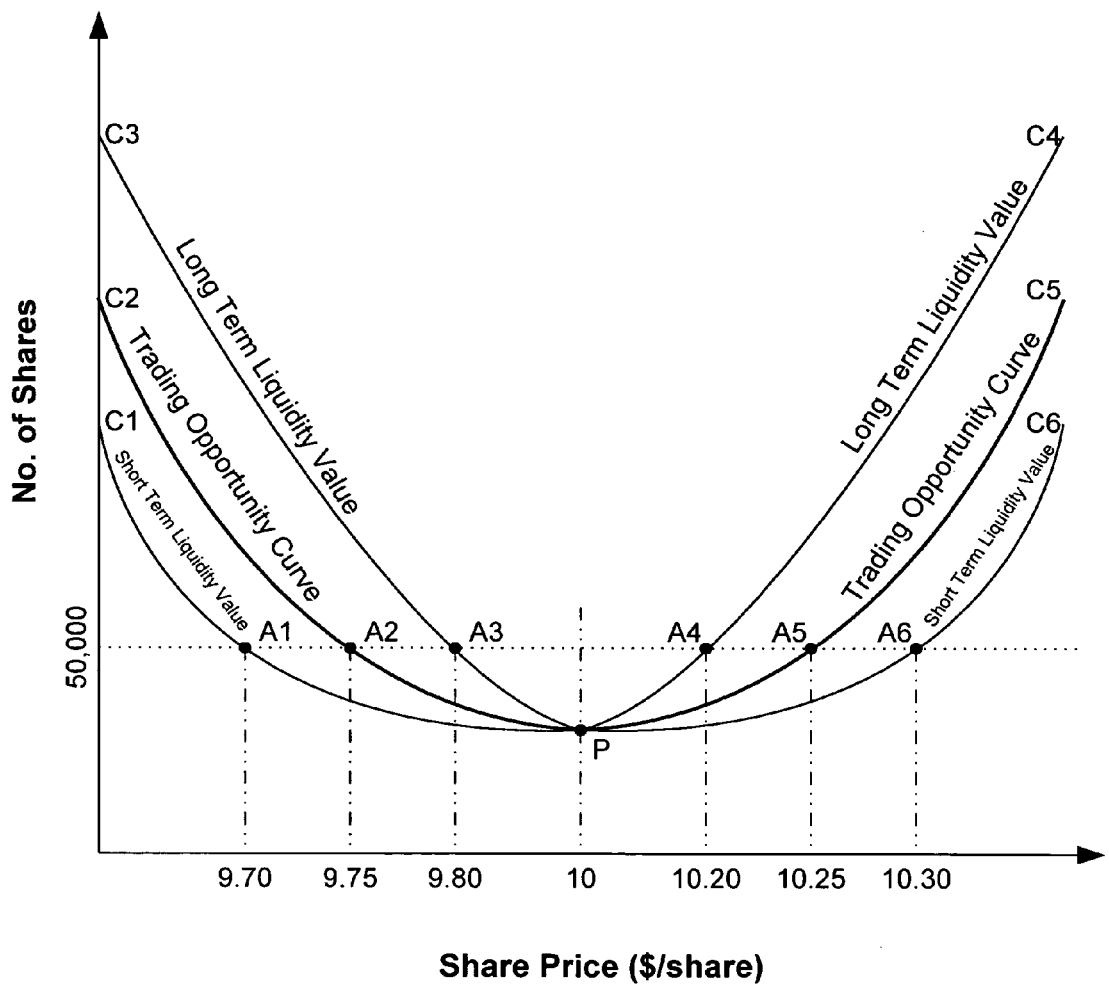
FIG. 11 is a graphical representation of positioning above/below market trade orders in accordance with an embodiment of the present invention.

FIG. 11 demonstrates this positioning of liquidity in a graphical form. Assume curves C1, C2 and C3 represent the following:

| C1: | Short term liquidity value |
|---|---|
| C2: | Trading opportunity curve |
| C3: | Long term liquidity value |

A1, A2 and A3 are three points on the curves C1, C2 and C3, respectively. Further assume the following values for these points:

| A1 = $9.70 | Estimated execution price of 50,000 share block if liquidated immediately on the open market. |
|---|---|
| A2 = $9.75 | Estimated trading opportunity for both parties. |
| A3 = $9.80 | Estimated execution price of 50,000 share block if liquidated in smaller lots over time on the open market. |

The current trading price (i.e., market value) for a financial instrument is $10/share, shown as point P on the graph of FIG. 11.

At point A2, both a buyer and seller agree to trade the 50,000 share block. The buyer measures her ability to make a profitable trade using long term liquidity curve C3 while the seller uses her ability to make a profitable trade using the short term liquidity curve C1. The buyer observes that the 50,000 shares traded at point A2 ($9.75/share) are worth the amount at point A3 ($9.80/share) based on long term liquidity curve C3. The seller observes that the 50,000 shares traded at point A2 ($9.75/share) are worth the amount at point A1 ($9.70/share) based on the short term liquidity curve C1. So it can be seen that the trading opportunity curve C2 provides an opportunity for both the buyer and the seller to make a profitable trade.

The profit and loss conditions for the party that posts the buy limit order (advertiser) can be summarized as follows:

profit when: (1−% discount)*current value/future estimated value<1 loss when: (1−% discount)*current value/future estimated value>1              Equation 1

The future estimated value is the price at which the buyer thinks she would be able to sell the stock after buying it at a % discount to the current market value. Based on this example, if the advertiser buys the stock at a 2.5% discount to the current value ($10/share) and estimates the future value at $9.80/share, she would make a profit. Based on this data the buyer's equation above (Equation 1) equals 0.995, which is less than 1 which indicates profit [(1-0.025)*$10/$9.80>1].

The profit and loss conditions for the seller that accepts the buy limit order can be summarized as follows:

profit when: estimated liquidation cost/discount>1 loss when: estimated liquidation cost/discount<1              Equation 2

As a further example, assume that a stock S is trading at $10/share (a current market value of the share) and it can absorb only 500 share blocks without significantly affecting the market. Further assume that there is a broker/dealer interested in selling short 50,000 shares of S providing she can sell short at a 2.5% premium (25 cents/share) higher than the market price of the stock which is constantly changing and is currently trading at $10/share. The broker/dealer estimates over the next three days she will be able to buy back the shares at an average price of $10.20/share, thus realizing a profit of $0.05 cents a share or $2500. However, to explore the possibility of finding a buyer, the broker/dealer places an order to sell 50,000 shares of S pegged at $0.25 higher than the current trading price of stock S.

A mutual fund wants to buy 50,000 shares of S, and estimates that if she places a market order to buy, she will realize an average execution price of $10.30/share. Thus, the estimated loss for the buyer would be $15,000 ($0.3/share*50,000 shares). The buyer sees the seller's order and estimates by accepting the price of $10.25 she will save $0.05/share or ($0.05*50,000) $2500 and thus reduce her acquisition cost of 50,000 shares of S from $15,000 to $12,500.

The mutual fund sees the posted order of the broker/dealer and accepts the price of $10.25 per share of S. In this instance both the broker/dealer and mutual fund receive a price improvement of $0.05 a share on the execution using the system. These price improvements are because of the inefficiency of current trading systems.

FIG. 11 further demonstrates this positioning of liquidity in a graphical form. Assume curves C4, C5 and C6 represent the following:

| C6: | Short term liquidity value |
|---|---|
| C5: | Trading opportunity curve |
| C4: | Long term liquidity value |

A4, A5 and A6 are three points on the curves C4, C5 and C6, respectively. Further assume the following values for these points:

| A6 = $10.30 | Estimated execution price of 50,000 share block if liquidated immediately on the open market. |
|---|---|
| A5 = $10.25 | Estimated trading opportunity for both parties. |
| A4 = $10.20 | Estimated execution price of 50,000 share block if liquidated in smaller lots over time on the open market. |

The current trading price (i.e., market value) for a financial instrument is $10/share, shown as point P on the graph of FIG. 11.

At point A5, both a buyer and seller agree to trade the 50,000 share block. The seller measures her ability to make a profitable trade using long term liquidity curve C4 while the buyer uses her ability to make a profitable trade using the short term liquidity curve C6. The seller observes that the 50,000 shares traded at point A5 ($10.25/share) are worth the amount at point A4 ($10.20/share) based on long term liquidity curve C4. The buyer observes that the 50,000 shares traded at point A5 ($10.25/share) are worth the amount at point A6 ($10.30/share) based on the short term liquidity curve C6. So it can be seen that the trading opportunity curve C5 provides an opportunity for both the buyer and the seller to make a profitable trade.

The profit and loss conditions for the party that posts the sell limit order (advertiser) can be summarized as follows:

profit when: (1+% premium)*current value/future estimated value>1 loss when: (1+% premium)*current value/future estimated value<1              Equation 3

The future estimated value is the price at which the seller thinks she would be able to buy back the stock after selling it for the % premium to the current market value. Based on this example, if the advertiser sells the stock at a 2.5% premium to the current value ($10/share) and estimates the future value at $10.20/share, she would make a profit. Based on this data the seller's equation above (EQUATION 3) equals 1.005, which is greater than 1 which indicates profit [(1+0.025)*$10/$10.20>1].

The profit and loss conditions for the buyer that accepts the sell limit order can be summarized as follows:

profit when: estimated cost of purchase/premium>1 loss when: estimated cost of purchase/premium<1     Equation 4

The trading system of the present invention also allows a trader to approve execution conditions before accepting a limit order, thus approving the allowance of a safety measure that reduces trading costs for those who place limit orders into the system.

Figure 12:
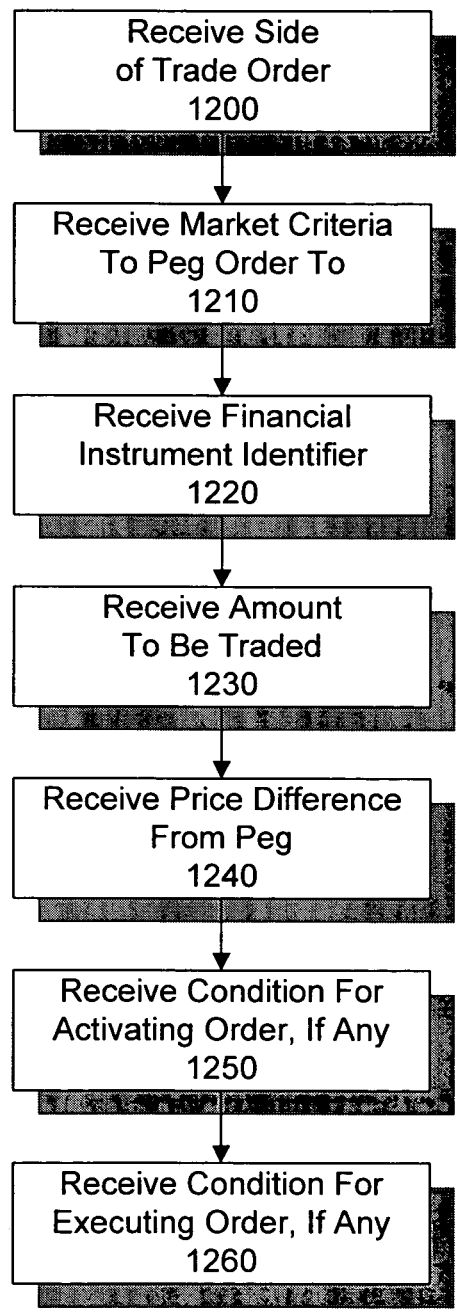
FIG. 12 is a flow chart that depicts order entry to an above/below market trading system in accordance with an embodiment of the present invention.

FIG. 12 depicts order entry to trading system 305 from a buyer or seller (e.g., user 300) in accordance with an embodiment of the present invention. In step 1200, trading system 305 receives the side of a trade order, such as "buy" or "sell". In step 1210, the system receives market criteria for calculating the market value to which the order will be pegged. This market criteria includes the bid, ask, midpoint of bid and ask, number of shares at a better price, last trade, trailing averages and any other formula that uses active market data to determine a price. The bid, ask and midpoint may include those prices determined by the NBBO.

The system then receives an identifier for the financial instrument to be traded (step 1220), along with the amount to be traded (step 1230). When using trading system 305 in the stock market, for example, the identifier and amount may include the symbol and number of shares of a stock, respectively. Trading system 305 may accept and trade orders for any financial instrument, including stocks, bonds, funds, contracts, options, futures, commodities and currencies.

In step 1240, the system receives the price difference from the pegged market value upon which the order may execute. This difference may be entered as a percentage or dollar amount, for example.

If user 300 desires to specify additional conditions for activating and/or executing the order, trading system 305 may receive such conditions in steps 1250 and 1260, respectively. These conditions are generally based on stable market data so that user 305 may insure against sudden price declines or surges. Order activation conditions may include, for example, activating the order only if the market value of the instrument remains unchanged for a particular interval of time (e.g., 15 seconds), or activating the order only on a one-minute up tick on a particular market index, such as the Dow Jones Industrial Average, NASDAQ composite index, etc. Order execution conditions may include, for example, completing the order only if a particular market index increases during a particular interval of time (e.g., one minute) after the order is accepted, completing the order only if the market value of the instrument remains unchanged for a particular interval of time (e.g., a random period between 15-45 seconds) or any other formula that uses active market data to determine a market condition of execution.

The following represents a possible user interface screen that may be presented to user 300 for entering order information:

1. Please enter:
   A. Buy
   B. Sell
2. Please enter what you want your order pegged to:
   A. Bid
   B. Ask
   C. Midpoint of bid and ask
   D. Last trade
   E. Custom Peg [see advanced features]
3. Please enter the symbol:
4. Please enter the number of shares to be traded:
5. Please enter the price or percentage difference from your peg:
6. Do you want a condition to activate your order? If so, choose:
   A. Activate my order only on a 1-minute up tick on the DJIA index.
   B. Activate my order only if the bid price remains unchanged for 15 seconds.
   C. Activate my order based on my own market criteria see advanced features.
7. Do you want a condition to execute your order? If so, choose:
   A. Execute my order only if 1 minute after the initial match the DJIA index increases in that minute.
   B. Execute my order only if after the initial match, the bid price remains unchanged for a random time period between 15-45 seconds.
   C. Execute my order based on my own market criteria see advanced features.

After trading system 305 receives the order, it is placed for public display. In one embodiment, the order may be posted on a web-accessible site over network 310, with each listing provided in a bulletin board type fashion. The system may choose to display limited information about the order to the public, such as the identity and amount of the order's underlying instrument, along with the distance from market value required to execute the order and any other execution conditions, if specified. Additionally, trading system 305 may allow user 300 to hide their order entirely, or show only a portion of their order.

Once the order is displayed, it may be accepted only if activated (i.e., made available for trading). Trading system 305 may indicate that an order is available for trading by, for example, associating a particular color with the posted order. In one embodiment, if an order is colored green, it is active (i.e., available for trading); if the order is colored gray, then the order is inactive (i.e., not available for trading)—potentially due to non-satisfaction of an activation condition.

Figure 13:
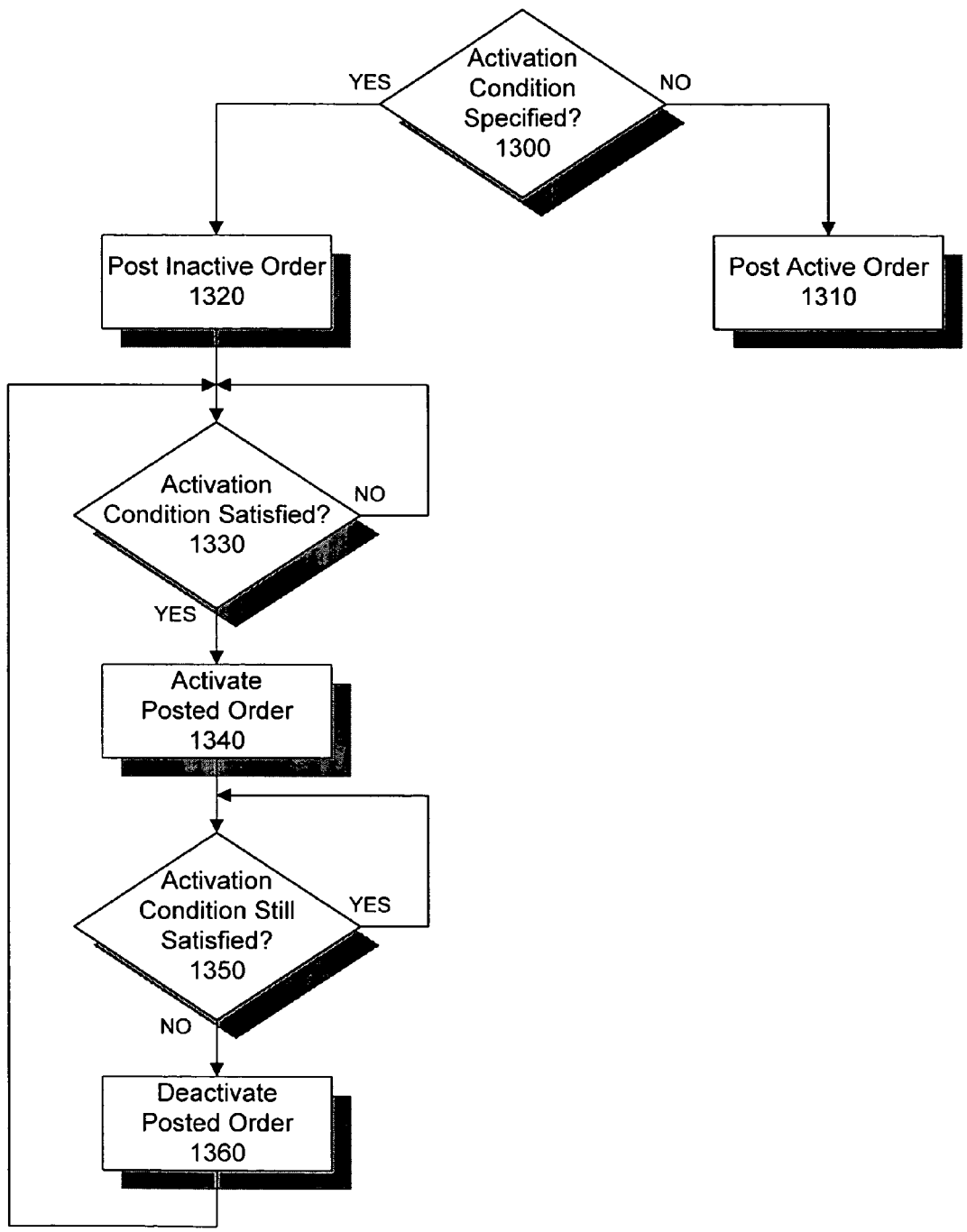
FIG. 13 is a flow chart that depicts activation of above/below market trades in accordance with an embodiment of the present invention.

FIG. 13 depicts an activation scenario in accordance with an embodiment of the present invention. If no activation conditions were specified with an order (step 1300), then trading system 305 posts an active order (step 1310). However, if activation conditions were specified, then the system posts an inactive order (step 1320) until all activation conditions are satisfied (step 1330). Once satisfied, the system activates the posted order (step 1340) while the activation conditions remain satisfied (step 1350). If they do not remain satisfied, the order is deactivated (step 1360) until the activation conditions become satisfied again.

An order posted by trading system 305 (whether active or inactive) may list the offered buy or sell price in different ways, such as by percentage (i.e., percentage discount off the current market value), a price differential (i.e., distance in monetary amount away from current market value), or the actual offered buy/sell price. For this last display method, trading system 305 may periodically (e.g., several times per minute) update the offered buy/sell price by scanning the current market price to which the order is pegged (using third party market scanning software in one embodiment), and subtracting/adding the specified distance from that market value for display.

Embodiments of trading system 305 are not limited in the ways in which an order may be accepted. In one embodiment, a user may accept a posted order by clicking on it. In another embodiment, a user may enter an order on the opposite side of an existing order in the system, and the system will automatically match the two orders (if conforming), resulting in acceptance. Users of trading system 305 may be registered with the system, and be required to enter user identification and passwords for authentication.

Figure 14:
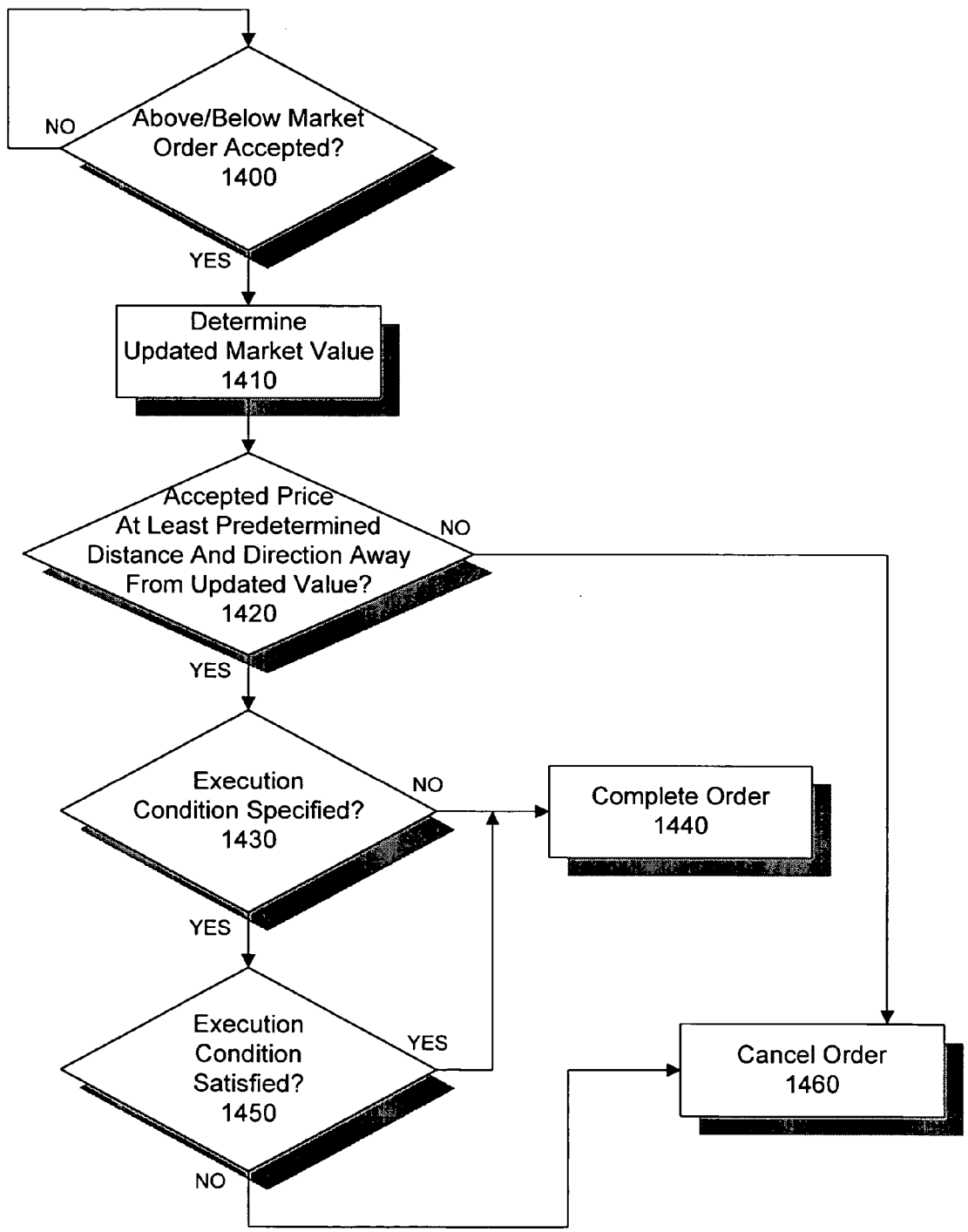
FIG. 14 is a flow chart that depicts execution of above/below market trades in accordance with an embodiment of the present invention.

Once the order is accepted, trading system 305 determines if it can be completed according to associated execution conditions. FIG. 14 depicts an execution scenario in accordance with an embodiment of the present invention.

Upon acceptance of the order (step 1400), the system scans the market to determine the updated market value of the underlying financial instrument (step 1410) according to the market criteria specified in the order by user 300. Third party software programs that scan market data may be utilized in this step. Once the updated market value is determined, if the accepted price is not at least the predetermined distance away from the updated value as specified in the order, then the order is canceled (step 1460). If the accepted price is at least the predetermined distance away from the updated value, then absent further execution conditions the order is completed (step 1440). Trading system 1440 may complete the order by, for example, executing the order itself or submitting the order to a third party system for execution.

If execution conditions were specified with the order (step 1430), then trading system 305 completes the order if the execution conditions are satisfied (step 1450). If the execution conditions are not satisfied, the order is canceled.

According to embodiments of the present invention, orders may not be completed, and users may not be notified of order acceptance and completion, until any and all associated activation and execution conditions are satisfied.

Listing 1 below illustrates hypothetical buy and sell orders as posted by trading system 305 in accordance with an embodiment of the present invention:

| | Listing 1 Stock XYZ | | |
| --- | --- | --- | --- |
| Reference | Amount | Price | Execution Condition |
| A | 400 | 80.02 | |
| B | 1,000 | 80.00 | |
| C | 1,200 | 79.99 | |
| D | 100,000 | 79.75 | B15 |
| E | 300 | 80.04 | |
| F | 800 | 80.07 | |
| G | 2,000 | 80.08 | |
| H | 75,000 | 80.20 | A15 |

For purposes of this listing, assume that the buy order marked by code identifier B 15 is pegged to the current bid price of stock XYZ, and includes an execution condition requiring the bid price to remain unchanged for 15-45 seconds after a seller accepts the order (hence, the "B" in the code stands for pegging to the bid price and the "15" stands for the particular execution condition and corresponding time interval). Any code identifier may be found in a dictionary of definitions in trading system 305. Thus, order D represents that the buyer will buy 100,000 shares of stock XYZ if the bid price remains unchanged for 15-45 seconds after the initial matching of orders. This particular execution condition prevents gaming of the system (the exact time period need not be disclosed to either the buyer or seller). The seller sees the code identifier and accepts the execution condition B15 set forth by the buyer. Once the seller accepts to sell 100,000 shares of stock XYZ, neither the buyer nor the seller may cancel the order until the system executes the trade or cancels it.

On the other side, assume that the sell order marked by code identifier A15 is pegged to the current ask price of stock XYZ, and includes an execution condition requiring the ask price to remain unchanged for 15-45 seconds after a buyer accepts the order (hence, the "A" in the code stands for pegging to the ask price and the "15" stands for the particular execution condition and corresponding time interval). Thus, order H represents that the seller will sell 75,000 shares of stock XYZ if the ask price remains unchanged for 15-45 seconds after the initial matching of orders. Similarly, the buyer sees the code identifier and accepts the execution condition A15 set forth by the seller. Once the buyer accepts to buy 75,000 shares of stock XYZ, neither the buyer nor the seller may cancel the order until the system executes the trade or cancels it.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method for trading financial instruments, comprising:
   receiving by a computer from a first party an order of trade of a financial instrument;
   receiving by the computer from a second party a contra order of trade of the financial instrument;
   matching by the computer the order of the first party with the contra order of the second party;
   assigning a time period of up to 10 seconds, wherein the assigned time period is not disclosed to the first and the second parties;
   beginning the assigned time period at the exact time the order and the contra order are matched;
   determining by the computer a market value of the financial instrument by conducting a first scan of quotes for the financial instrument in the match of the order and the contra order in other systems of the market at the beginning of the assigned time period;
   determining by the computer an updated market value of the financial instrument by conducting a second scan of quotes for the financial instrument in the match of the order and the contra order in other systems of the market at the end of the assigned time period; and
   completing by the computer the order only if the market value of the financial instrument remains unchanged between the beginning and the end of the assigned time period.

2. The method of claim 1, wherein the market value is based on a bid price.

3. The method of claim 1, wherein the market value is based on an ask price.

4. The method of claim 1, wherein the particular interval of time includes a minimum time limit.

5. The method of claim 1, wherein the assigned time period includes a maximum time limit.

6. The method of claim 1, wherein assigned time period includes a time period between a minimum time limit and a maximum time limit.

7. The method of claim 6, wherein the assigned time period includes a random time period within the minimum time limit and the maximum time limit.

8. The method of claim 1, wherein the assigned time period includes a pre-set time period.

9. The method of claim 1, wherein the assigned time period includes a period of time during which the market value of the financial instrument is verified.

\* \* \* \* \*